United States Patent
Lu et al.

(10) Patent No.: US 11,083,065 B2
(45) Date of Patent: Aug. 3, 2021

(54) DRIVING CIRCUIT DEVICE FOR ANTI-LEAKAGE LED TUBE WITH DUAL-END INPUT

(71) Applicant: Xiamen PVTECH Co., Ltd., Fujian (CN)

(72) Inventors: Fuxing Lu, Fujian (CN); Rongtu Liu, Fujian (CN)

(73) Assignee: Xiamen PVTECH Co., Ltd., Fujian (CN)

( * ) Notice: Subject to any disclaimer, the term of this patent is extended or adjusted under 35 U.S.C. 154(b) by 0 days.

(21) Appl. No.: 16/854,842

(22) Filed: Apr. 21, 2020

(65) Prior Publication Data

US 2021/0204377 A1     Jul. 1, 2021

(30) Foreign Application Priority Data

Dec. 25, 2019   (CN) .......................... 201911364205.7

(51) Int. Cl.
*H05B 45/37*     (2020.01)
(52) U.S. Cl.
CPC ..................................... *H05B 45/37* (2020.01)
(58) Field of Classification Search
CPC ................................ H05B 45/37; F21K 9/278
See application file for complete search history.

(56) References Cited

U.S. PATENT DOCUMENTS

| 2014/0239834 A1* | 8/2014 | Choi | ...................... | H05B 45/37 |
| | | | | 315/205 |
| 2016/0174307 A1* | 6/2016 | Tao | ........................ | H05B 45/37 |
| | | | | 315/85 |
| 2017/0311397 A1* | 10/2017 | Hsia | ........................ | H02M 1/32 |

\* cited by examiner

*Primary Examiner* — Alexander H Taningco
*Assistant Examiner* — Pedro C Fernandez
(74) *Attorney, Agent, or Firm* — Winston Hsu

(57) ABSTRACT

A driving circuit device for anti-leakage LED tube with dual-end input is provided. Two ends of the LED tube have two conductive pin assemblies electrically connected to mains supply. Each of the conductive pin assemblies includes two pins. One of the conductive pin assemblies is connected to an input bridge rectifier and has an output end. A constant current module has an input end. The input end of the constant current module is connected to the output end of the anti-leakage detection module. The anti-leakage detection module is provided for detecting a current state. A current is controlled to be outputted from the output end and to be inputted into the input end according to the current state, and the constant current module is changed to output a loop current not exceeding a rated standard.

6 Claims, 3 Drawing Sheets

DRIVING CIRCUIT DEVICE FOR ANTI-LEAKAGE LED TUBE WITH DUAL-END INPUT

BACKGROUND OF THE INVENTION

1. Field of the Invention

The present invention relates to a lamp device, in particular to a driving circuit device for anti-leakage LED tube with dual-end input.

2. Description of the Prior Art

As shown in FIG. 1, a typical circuit block diagram for preventing electricity leakage of a dual-end lamp tube during the assembly is provided, and as shown, the adoption is popular and common. Specifically, the conductive pin assemblies 10 are connected to two ends of the lamp tube 1 for driving, the input bridge rectifier 11 is connected to the conductive pin assemblies 10 for voltage conversion, the electricity leakage detection control circuit 12 is connected to the execution metal oxide semiconductor (MOS) 120, and the constant current control module 13 is used to decrease or increase the voltage and used to control the current value outputted to the LED light source for the integrated circuit (IC).

The existing control plan is to control the open and close of the loop current of the entire post load during the controller is operated or is switched on or off. As a result, the execution MOS 120 has to bear greater voltage stress and current stress. In such plan, some problems occur, such as, the component is complicated, the execution MOS 120 for the main control function costs a lot, and the control may be failed due to the large control current.

Therefore, how to address the issues is to be considered.

SUMMARY OF THE INVENTION

In view of these, in one embodiment, a driving circuit device for anti-leakage LED tube with dual-end input is provided. Two ends of the LED tube have two conductive pin assemblies electrically connected to mains supply. Each of the conductive pin assemblies comprises two pins. One of the conductive pin assemblies is connected to an input bridge rectifier and has an output end. A constant current module has an input end. The input end of the constant current module is connected to the output end of the anti-leakage detection module. The anti-leakage detection module is provided for detecting a current state. A current is controlled to be outputted from the output end and to be inputted into the input end according to the current state, and the constant current module is changed to output a loop current not exceeding a rated standard.

Based on the above, according to one or more embodiments, the execution MOS can be omitted thereby reducing the overall costs for the control plan. Moreover, the standby current for the constant current module can be reduced to be lower than 2 mA, thereby ensuring the overall loop current is lower than the standard value (5 mA) when the anti-leakage detection module operates and when the constant current module is in the standby state).

In some embodiments, the anti-leakage detection module and the constant current module are integrated as a single IC packaging structure.

In some embodiments, the output end of the anti-leakage detection module and the input end of the constant current module are led out individually for connecting to an external electrical signal.

In some embodiments, the external electrical signal is an electrical ballast or the alternating current from the mains supply.

In some embodiments, each of the conductive pin assemblies is connected to a fuse.

In some embodiments, the fuse is a current-limiting fuse, a temperature-limiting fuse, or a self-recoverable fuse.

In some embodiments, the rated standard for the loop current is 5 mA.

In some embodiments, the current state is an electricity leakage state or a normal operation state.

The detailed features and the advantages of the present invention will become more obvious from the following description for any person having ordinary skills in the art to carry out the claimed invention.

DETAILED DESCRIPTION

The detailed description of the technical content, structural features, and the objects and effects of the technical solutions will be described in detail below with reference to the specific embodiments and the accompanying drawings.

Figure 1:
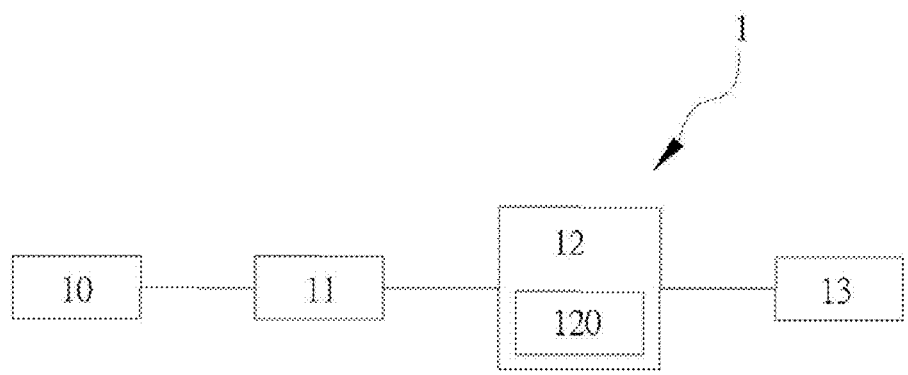
FIG. 1 illustrates a typical circuit block diagram for preventing electricity leakage of a dual-end lamp tube during the assembly.
Figure 2:
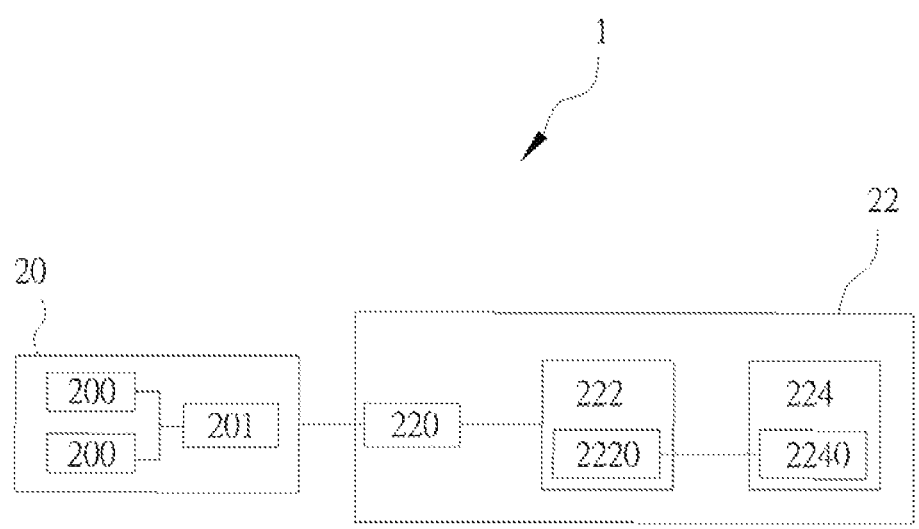
FIG. 2 illustrates a circuit block diagram of the driving circuit device for LED tube according to an exemplary embodiment of the present invention.

Please refer to FIG. 2, a circuit block diagram of a driving circuit device for anti-leakage LED tube with dual-end input according to an exemplary embodiment is illustrated. The present invention provides a driving circuit device for an anti-leakage LED tube with dual-end input. Two ends of the LED tube 2 have two conductive pin assemblies 20 electrically connected to the mains supply (the conductive pin assembly 20 is further connected to a fuse 201). Each of the conductive pin assemblies 20 comprises two pins 200. The driving circuit device 22 comprises an input bridge rectifier 220, an anti-leakage detection module 222, and a constant current module 224. The input bridge rectifier 220 is connected to the conductive pin assemblies 20. The anti-leakage detection module 222 is connected to the input bridge rectifier 220 and has an output end 2220. The constant current module 224 has an input end 2240. The input end 2240 is connected to the output end 2220 of the anti-leakage detection module 222. The anti-leakage detection module 222 is provided for detecting a current state. A current is controlled to be outputted from the output end 2220 and to be inputted into the input end 2240 according to the current state. The constant current module 224 is changed to output a loop current not exceeding a rated standard.

Moreover, in one embodiment, the anti-leakage detection module 222 and the constant current module 224 are integrated as a single IC packaging structure. Furthermore, the output end 2220 of the anti-leakage detection module 222 and the input end 2240 of the constant current module 224 are led out individually through the conductive pin assemblies 20 for connecting to an external electrical signal (which may be an electrical ballast or the alternating current from the mains supply).

In one embodiment, the fuse 201 may be a current-limiting fuse, a temperature-limiting fuse, or a self-recoverable fuse.

When the anti-leakage detection module 222 detects an electricity leakage condition, the output end 2220 outputs current in low frequency to the input end 2240 of the constant current module 224 to close the constant current module 224 and to stop the operation of the LED tube 2. Therefore, the constant current module 224 does not generate a loop current (leakage current) higher than the rated standard (in this embodiment, the loop current for the rated standard is 5 mA, for example).

Moreover, by the integration of the anti-leakage detection module 222 and the constant current module 224, the standby current of the constant current module 222 can be reduced, thereby allowing the standby current of the constant current module 222 to be lower than 2 mA, thereby ensuring the overall loop current is lower than the rated standard value (for example, 5 mA) when the anti-leakage detection module 222 operates and when the constant current module 224 is in the standby state).

Figure 3:
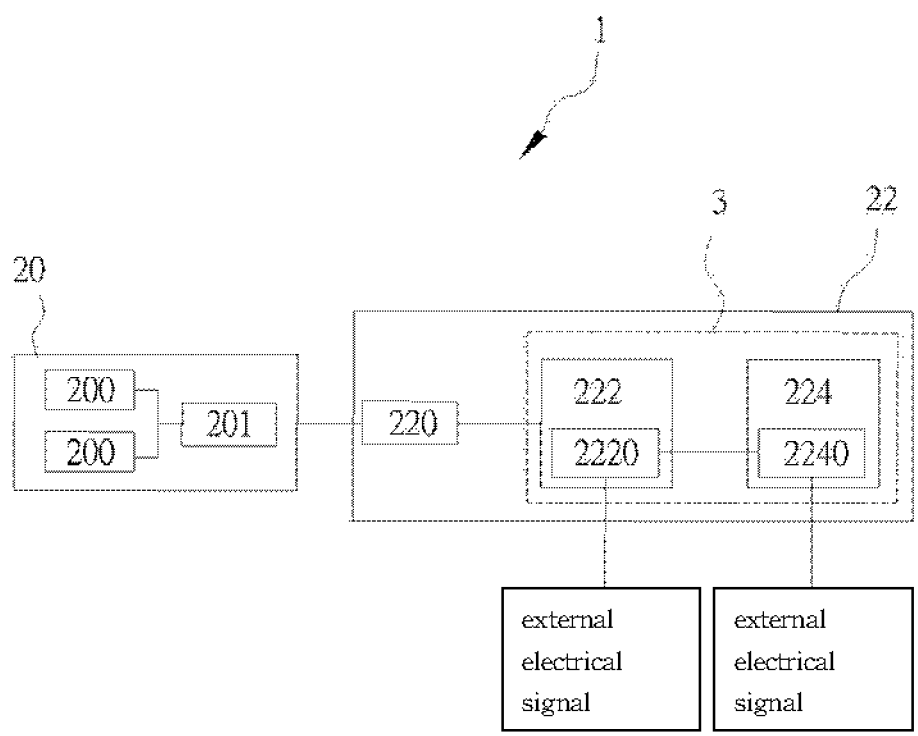
FIG. 3 illustrates a circuit block diagram showing the combination of the anti-leakage detection module and the constant current module of the driving circuit device.

Moreover, as shown in FIG. 3, a circuit block diagram showing the combination of the anti-leakage detection module 222 and the constant current module 224 is illustrated. The anti-leakage detection module 222 and the constant current module 224 are integrated as a single IC packaging structure, and output end 2220 of the anti-leakage detection module 222 and the input end 2240 of the constant current module 224 can be led out individually. Therefore, the LED tube 2 can have the anti-leakage protection function as well as being compatible to the electricity supply from an electrical ballast or from the mains supply.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A driving circuit device for anti-leakage LED tube with dual-end input, wherein two ends of the LED tube have two conductive pin assemblies electrically connected to a mains supply; each of the conductive pin assemblies comprises two pins; wherein the driving circuit device comprises an input bridge rectifier connected to the conductive pin assemblies; an anti-leakage detection module connected to the input bridge rectifier and having an output end; and a constant current module having an input end connected to the output end of the anti-leakage detection module;

wherein the anti-leakage detection module is provided for detecting a current state, a current is controlled to be outputted from the output end and to be inputted into the input end according to the current state; and the constant current module is changed to output a loop current not exceeding a rated standard, and the output end of the anti-leakage detection module and the input end of the constant current module are led out individually for connecting to an external electrical signal; and wherein the anti-leakage detection module and the constant current module are integrated as a single IC packaging structure.

2. The driving circuit device according to claim 1, wherein the external electrical signal is an electrical ballast or alternating current from the mains supply.

3. The driving circuit device according to claim 1, wherein each of the conductive pin assemblies is connected to a fuse.

4. The driving circuit device according to claim 3, wherein the fuse is a current-limiting fuse, a temperature-limiting fuse, or a self-recoverable fuse.

5. The driving circuit device according to claim 1, wherein the rated standard for the loop current is 5 mA.

6. The driving circuit device according to claim 1, wherein the current state is an electricity leakage state or a normal operation state.

\* \* \* \* \*